(12) United States Patent
Lowe

(10) Patent No.: US 10,596,776 B1
(45) Date of Patent: Mar. 24, 2020

(54) PINE STRAW BALING APPARATUS AND METHOD

(71) Applicant: Swift Straw Holdings, LLC, Atlanta, GA (US)

(72) Inventor: Matt Lowe, Atlanta, GA (US)

(73) Assignee: Swift Straw Holdings, LLC, Atlanta, GA (US)

( * ) Notice: Subject to any disclaimer, the term of this patent is extended or adjusted under 35 U.S.C. 154(b) by 660 days.

(21) Appl. No.: 14/978,967

(22) Filed: Dec. 22, 2015

Related U.S. Application Data

(60) Provisional application No. 62/251,771, filed on Nov. 6, 2015.

(51) Int. Cl.
*B30B 9/30* (2006.01)
(52) U.S. Cl.
CPC ............ *B30B 9/3007* (2013.01); *B30B 9/301* (2013.01); *B30B 9/3057* (2013.01)
(58) Field of Classification Search
CPC ....... A01F 15/10; A01F 15/106; A01D 89/00; B30B 9/301
USPC .......................................... 100/189, 188 R, 7
See application file for complete search history.

(56) References Cited

U.S. PATENT DOCUMENTS 6,820,542 B1 * 11/2004 Truitt ...................... A01F 15/07
100/3
2011/0023442 A1 * 2/2011 Herron ................ A01F 15/0705
56/341
2013/0036921 A1 * 2/2013 Horstmann ......... A01F 15/0705
100/5
2016/0243779 A1 * 8/2016 Woosley ............... A01F 15/046

OTHER PUBLICATIONS

Foster Kohler 40-1-20-GC Gas hydraulic power unit, <https://web.archive.org/web/20110208041251/http://www.fostermfgcorp.com/page/gas/40_hp.html>, Feb. 8, 2011.*

* cited by examiner

*Primary Examiner* — Elaine Gort
*Assistant Examiner* — Christopher B Wehrly
(74) *Attorney, Agent, or Firm* — C. Brandon Browning; Maynard, Cooper & Gale, PC

(57) ABSTRACT

An apparatus and method for baling plant materials such as grasses, leaves and pine straw a hydraulic power unit, a conveyor operatively coupled to the hydraulic power unit, a hopper for depositing the material on a proximal end of the conveyor and a baler operatively coupled to the hydraulic power unit and arranged for receiving a material from the conveyor. The power unit, conveyor and baler are supported on a trailer. An electronic control system is operatively coupled to the hydraulic power unit, the conveyor and the baler for automatically suspending operation of the conveyor when the baler contains a sufficient amount of material for initiating bundling of the material and automatically resuming operation of the conveyor following dispensing of a bundle of the material from the baler.

6 Claims, 9 Drawing Sheets

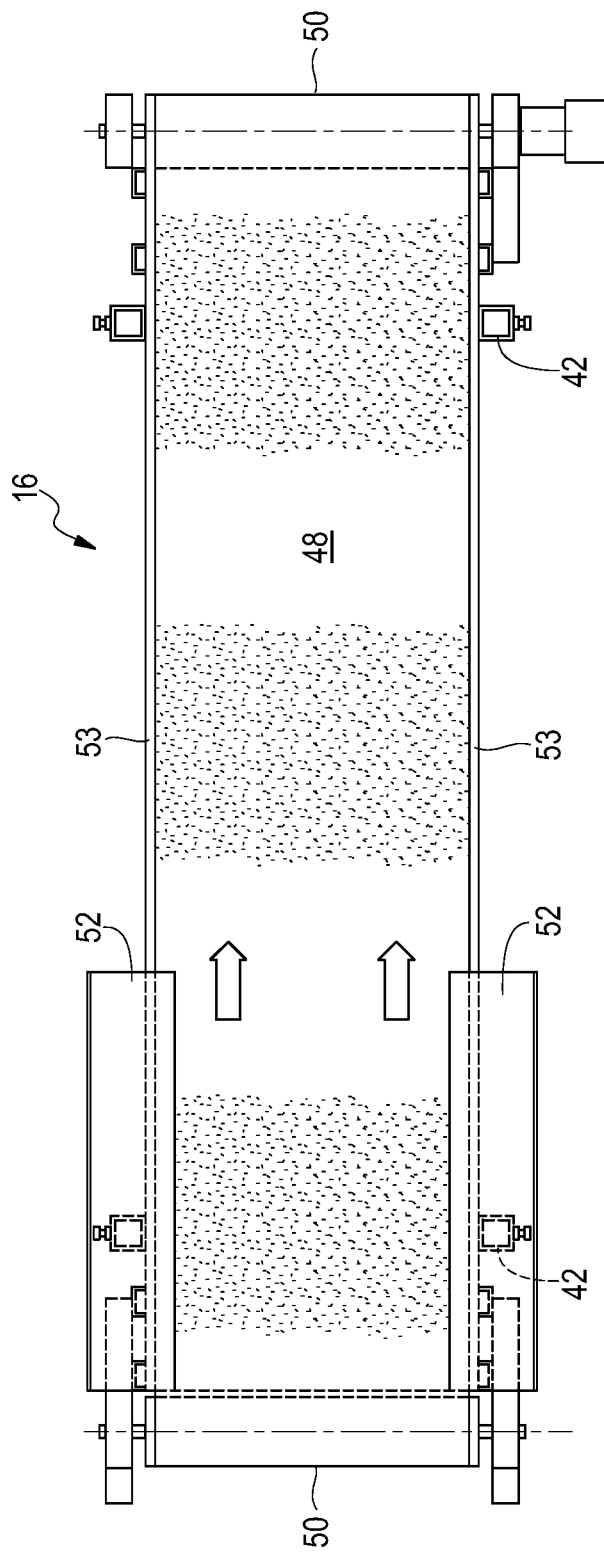
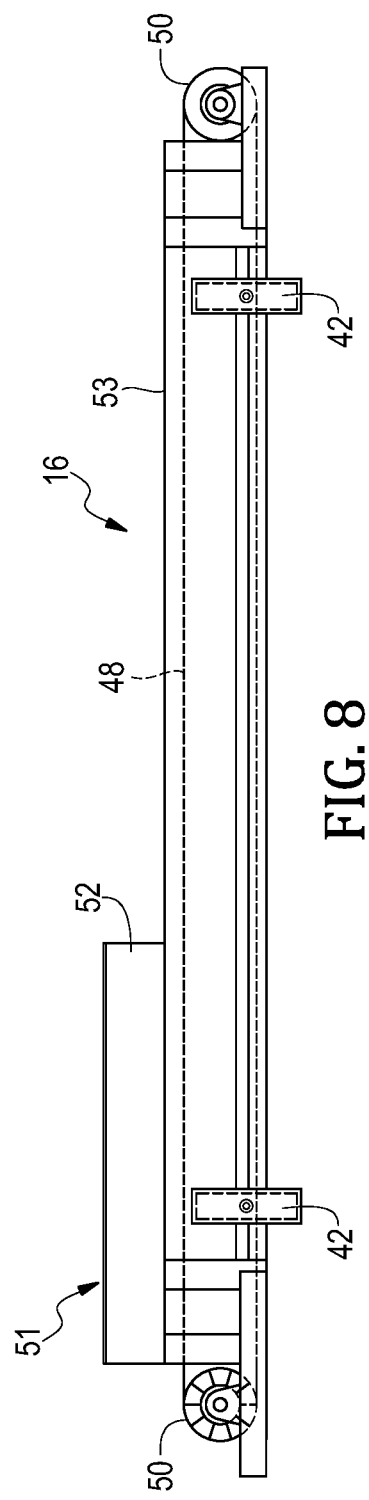
FIG. 7
FIG. 8

PINE STRAW BALING APPARATUS AND METHOD

RELATED APPLICATIONS

This application claims priority to U.S. Provisional Patent Application No. 62/251,771, filed on Nov. 6, 2015 and entitled "Pine Straw Baling Apparatus and Method," the entire contents of which are incorporated herein.

FIELD OF THE INVENTION

The present invention relates to an apparatus and method for baling pine straw.

BACKGROUND OF THE INVENTION

Balers are known in the art. For example, U.S. Pat. No. 7,818,954 is directed to an apparatus for baling a crop with stiff stalks such as corn stalks. The apparatus includes frame with a front and a rear and at least one ground engaging wheel operatively attached to the frame for facilitating movement of the frame in a forward direction. An accumulator is operatively attached to the frame for holding the crop in various amounts. A pickup is operatively attached to the front of the frame for picking up the crop from a field and transferring the crop into the accumulator. A baler is operatively attached to the frame behind the accumulator for transforming a crop into a bale. A conveyor is provided in the accumulator for moving the crop in the accumulator to the inlet of the baler.

U.S. Patent Application Publication No. 20140237981 is directed to a crop collection device including a first conveyor and a second conveyor and a crop outlet positioned at the most rearward end of the crop collection device. The crop collection device outlet is adapted to align the first conveyor to the inlet of a bale chamber. The crop collection device feeds harvested crop material into a bale chamber by conveying crop from the first conveyor to the second conveyor and then finally to the bale chamber. The first conveyor positioned over the second conveyor and each of the first and second conveyors are independently movable in the forward and aft directions. The device further includes an agricultural harvester that comprises a crop collection device and a bale ejection system with increased efficiency for continuous operation.

SUMMARY OF THE INVENTION

The present invention is directed to an apparatus and method for baling plant materials such as grasses, leaves and pine straw. According to one aspect of the invention, there is provided a baling system including a gasoline powered, hydraulic power unit, a conveyor operatively coupled to the hydraulic power unit, a hopper for depositing the material on a proximal end of the conveyor and a baler operatively coupled to the hydraulic power unit and arranged for receiving a material from the conveyor. The power unit, conveyor and baler are supported on a frame such a wheeled trailer including a ball hitch and a jack. An electronic control system is operatively coupled to the hydraulic power unit, the conveyor and the baler for automatically suspending operation of the conveyor when the baler contains a sufficient amount of material for initiating bundling of the material and automatically resuming operation of the conveyor following dispensing of a bundle of the material from the baler. A ramp is supported on a distal end of the frame for receiving the bundle from baler and delivering the bundle to a desired location. To that end, the hydraulic power unit is supported by a proximal end of the frame, the baler is supported by the distal end of the frame and the conveyer is supported along a middle section of the frame.

In use, a plant material is placed on the conveyor while the frame is stationary. The conveyor then transports the pine straw to the baler where the material accumulates within a bundling compartment of baler. Once a sufficient amount of the material is accumulated in the bundling compartment, conveyance of the material into the baler is suspended and the baler wraps the material to form a bale of the material. After the bale is formed, a hatch opens and the bale is dispensed from the bale onto the ramp. After the bale is dispensed, the conveyor resumes conveying the material into the baler.

According to another aspect of the invention, there is provided a method of baling a material. The method includes supporting a hydraulic power unit, a conveyor and a baler on a frame, manually placing a material on the conveyor, conveying the material to the baler, bundling the material within the baler and dispensing a bale of the material from the baler. A first sensor is located within the baler for determining when the conveyor should suspend conveying the material to the baler since material need not be delivered to the baler while bundling of the material is taking place. A second sensor is used to determine when the conveyor should resume conveying the material to the baler. This typically occurs after the bale is dispensed from the baler. During operation of the conveyor and the baler, the frame does not move relative to a surface on which the frame is located since movement of the frame is not required to load material onto the conveyor or into the baler.

According to yet another aspect of the invention there is provided a method of baling a material including providing a baling apparatus including a hydraulic power unit, a conveyor belt operatively coupled to the hydraulic power unit by a conveyor motor, a baler operatively coupled to the hydraulic power unit by a drive shaft powered by a baler motor and an electronic control system, wherein the hydraulic power unit, the conveyor belt, the conveyor motor, the baler, the drive shaft, the baler motor and the electronic control system are supported on a frame. A material such as pine straw is placed by hand or by using a pitchfork on the conveyor and conveyed into the baler. Once a sufficient amount of the material accumulates within the baler, for example, the material exhibits a sufficient weight or density, the electronic control system automatically suspends conveyance of the material into the baler. The baler then bundles the material into a bale which is dispensed from a back of the frame. Following dispending of the bale, the electronic control system automatically resumes conveyance of the material into the baler. In the event of a malfunction, the electronic control system can be used to switch operation of the baling apparatus from an automatic mode to a manual mode. This allows suspending conveyance of the material into the baler by manually manipulating a switch.

BRIEF DESCRIPTION OF THE DRAWINGS

FIG. 7 is a top plan view of a conveyor system of the baling apparatus of FIG. 1.

FIG. 8 is an elevational view of the conveyor system of FIG. 7.

DETAILED DESCRIPTION OF PRESENTLY PREFERRED EMBODIMENTS

Figure 1:
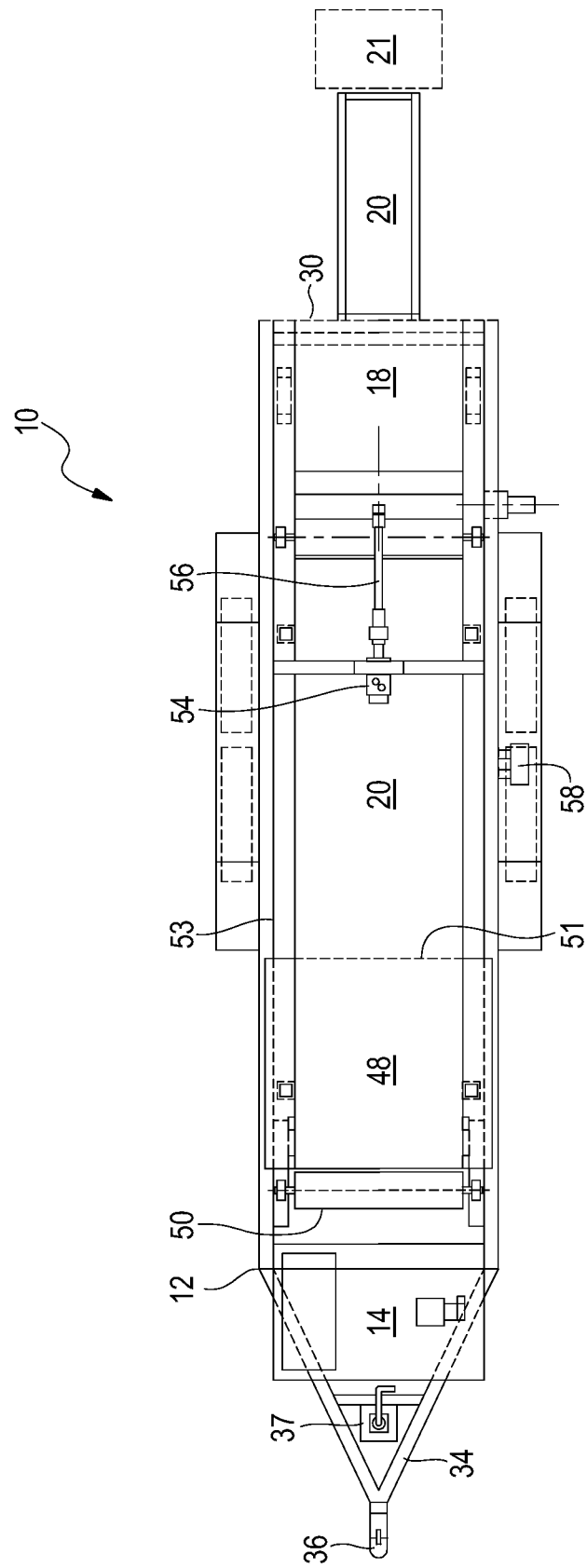
FIG. 1 is a top plan view of a baling apparatus in accordance with the present invention.
Figure 2:
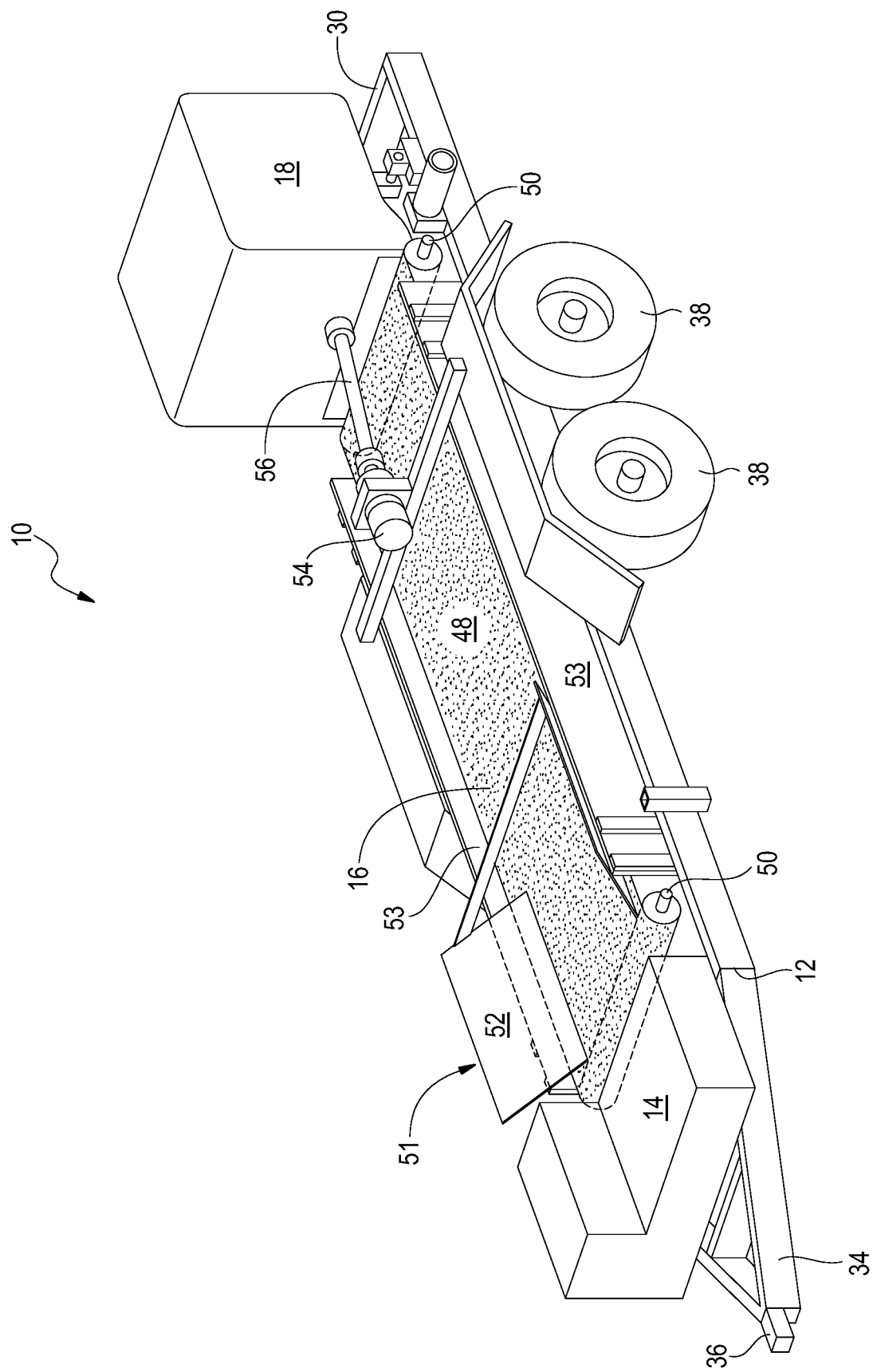
FIG. 2 is a front perspective view of the baling apparatus of FIG. 1.
Figure 3:
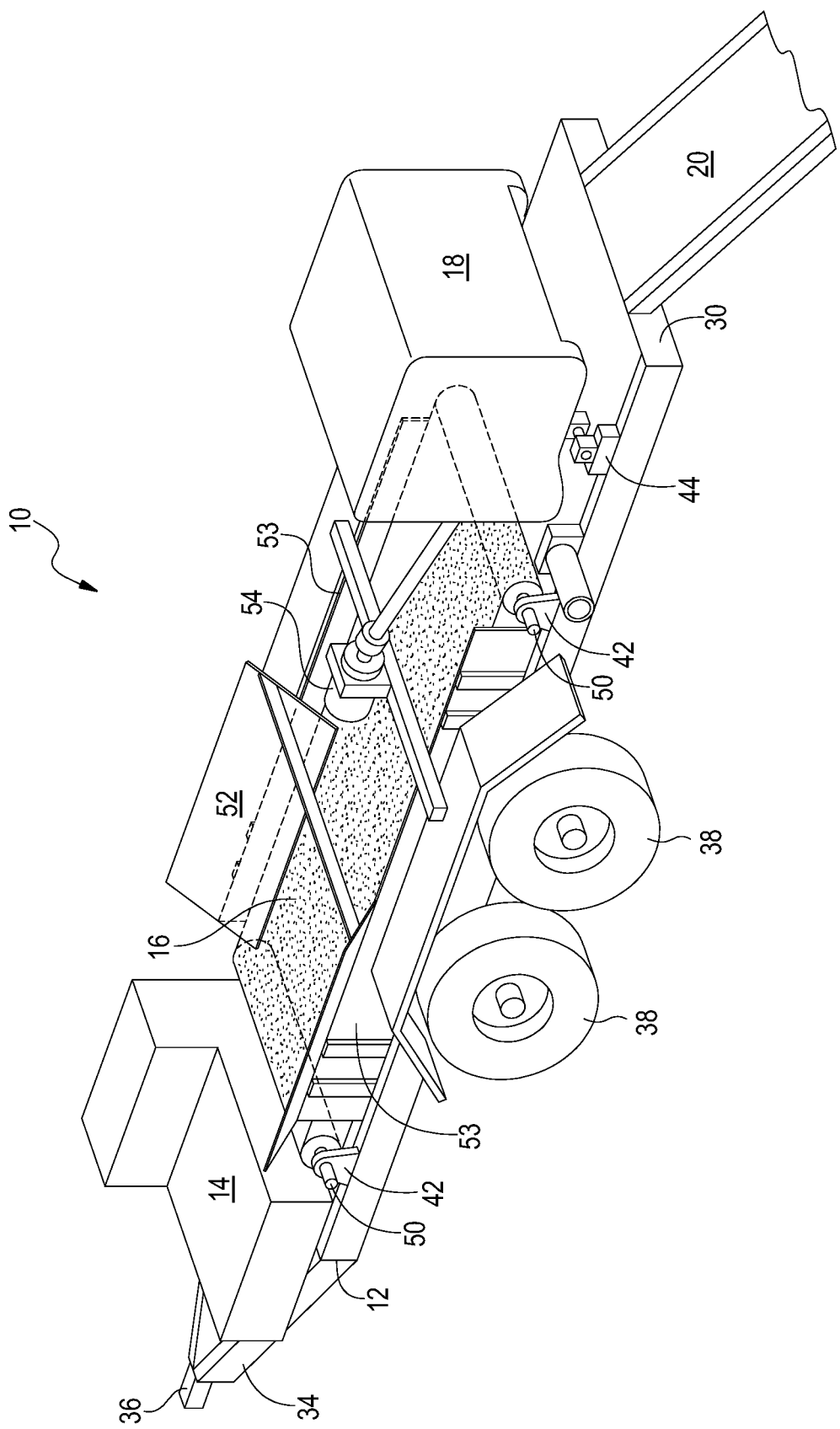
FIG. 3 is a rear perspective view of the baling apparatus of FIG. 1.

FIGS. 1 through 10 depict a baling apparatus 10 for receiving, conveying and baling a plant material, preferably, pine straw. Generally, baling apparatus 10 includes a movable frame 12, a hydraulic power unit 14, a conveyor 16, a baler 18 arranged to receive the plant material from the conveyor and an outlet ramp 20 arranged to receive a round bale 21 of the plant material from the baler and deposit the bale on the ground or a pallet.

Figure 5:
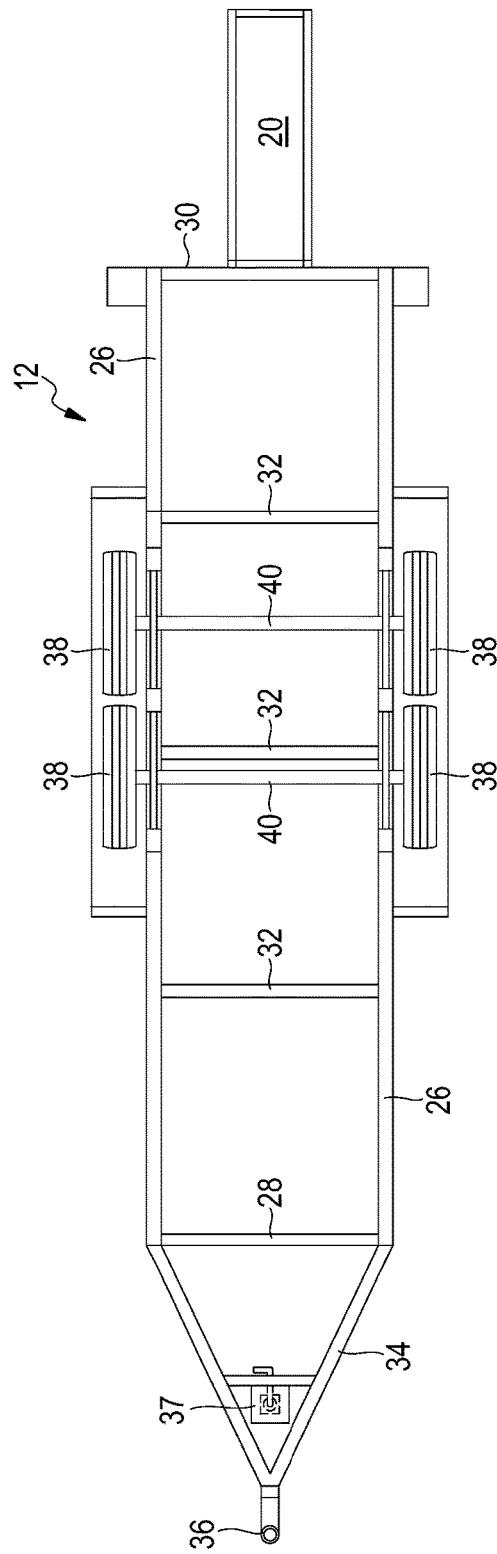
FIG. 5 is a bottom plan view of the baling apparatus of FIG. 1.
Figure 6:
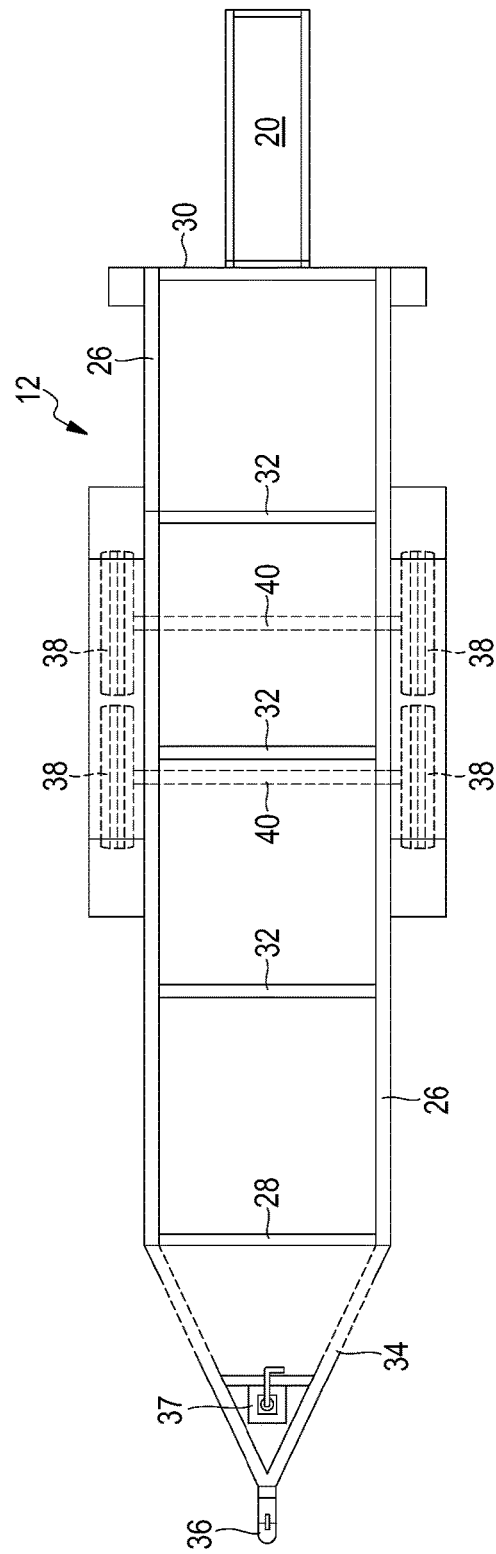
FIG. 6 is a top plan view of a trailer of the baling apparatus of FIG. 1.

Referring to FIGS. 5 and 6, frame 12 includes a rectangular chassis formed by a pair of opposing lateral beams 26, a front end beam 28 and a rear end beam 30. At least three cross-beams 32 extend between and connect opposing lateral beams 26 to one another along a middle section of frame 12. Opposing lateral beams 26, front beam 28 and rear beam 30 are preferably fabricated from 3"×6"×¼" wall tubing which forms a rigid structure upon which hydraulic power unit 14, conveyor 16, baler 18 and outlet ramp 20 are supported. Preferably, frame 12 is eighteen feet long and 5.8 feet wide.

Figure 4:
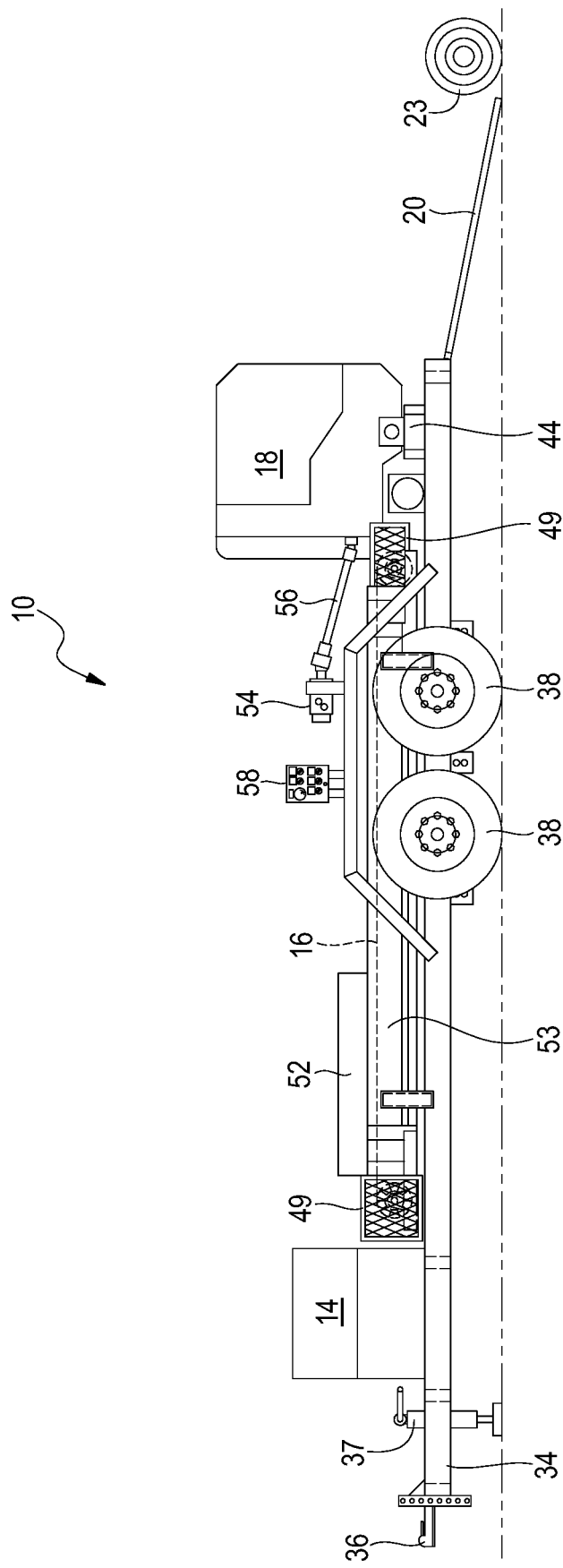
FIG. 4 is an elevational view of a side of the baling apparatus of FIG. 1.

So that the chassis can be towed behind a motor vehicle to areas where plant material has been gathered, frame 12 further includes a triangular tow portion 34 and a set of wheels 38. Tow portion 34 is formed by a pair of intersecting beams that extend forward from front end beam 28. Tow portion 34 includes a ball hitch 36 for coupling frame 12 to a motor vehicle and a manually operated jack 37. As depicted in FIG. 4, when extended, jack 37 serves to support the front end of the frame 12 on a surface, for example, when baling apparatus 10 is stationary or in use. Wheels 38 are rotatably supported on a pair of dropped axles 4 which extend between and under opposing lateral beams 26. When it is desired to move baling apparatus 10 along a surface, hitch 36 is coupled to a motor vehicle, jack 37 is retracted and frame 12 is pulled by the motor vehicle along the surface on wheels 38.

As depicted in FIGS. 1 through 4, hydraulic power unit 14, conveyor 16, baler 18 and outlet ramp 20 are supported on frame 12. In particular, hydraulic power unit 14 is bolted directly to and on top of tow portion 34 and front end beam 28. Preferably, hydraulic power unit 17 is a hydrocarbon fuel-powered hydraulic unit such as a gasoline powered hydraulic unit. An exemplary hydraulic power unit 14 is the Foster 40-1-20-GC hydraulic power unit manufactured by Foster Manufacturing Corporation of Racine, Wis. The Foster 40-1-20-GC hydraulic power unit includes a gasoline-powered engine. Conveyor 16, which extends rearward from a location adjacent to hydraulic power unit 17 to a location adjacent to baler 18, is bolted to opposing lateral beams 26 of frame 12 using at least two pairs of conveyor mounts 42, with one pair of mounts located at a front end of conveyor 16 and another pair of mounts located at a rear end of conveyor 16. Similarly, baler 18 is bolted to opposing lateral beams 26 at locations adjacent to rear end beam 30 using a set of baler mounts 44. Preferably, baler 18 is round baler. An exemplary baler is the MRB 850 TN compact round baler manufactured by Small Farm Innovations of Caldwell, Tex.

Figure 11:
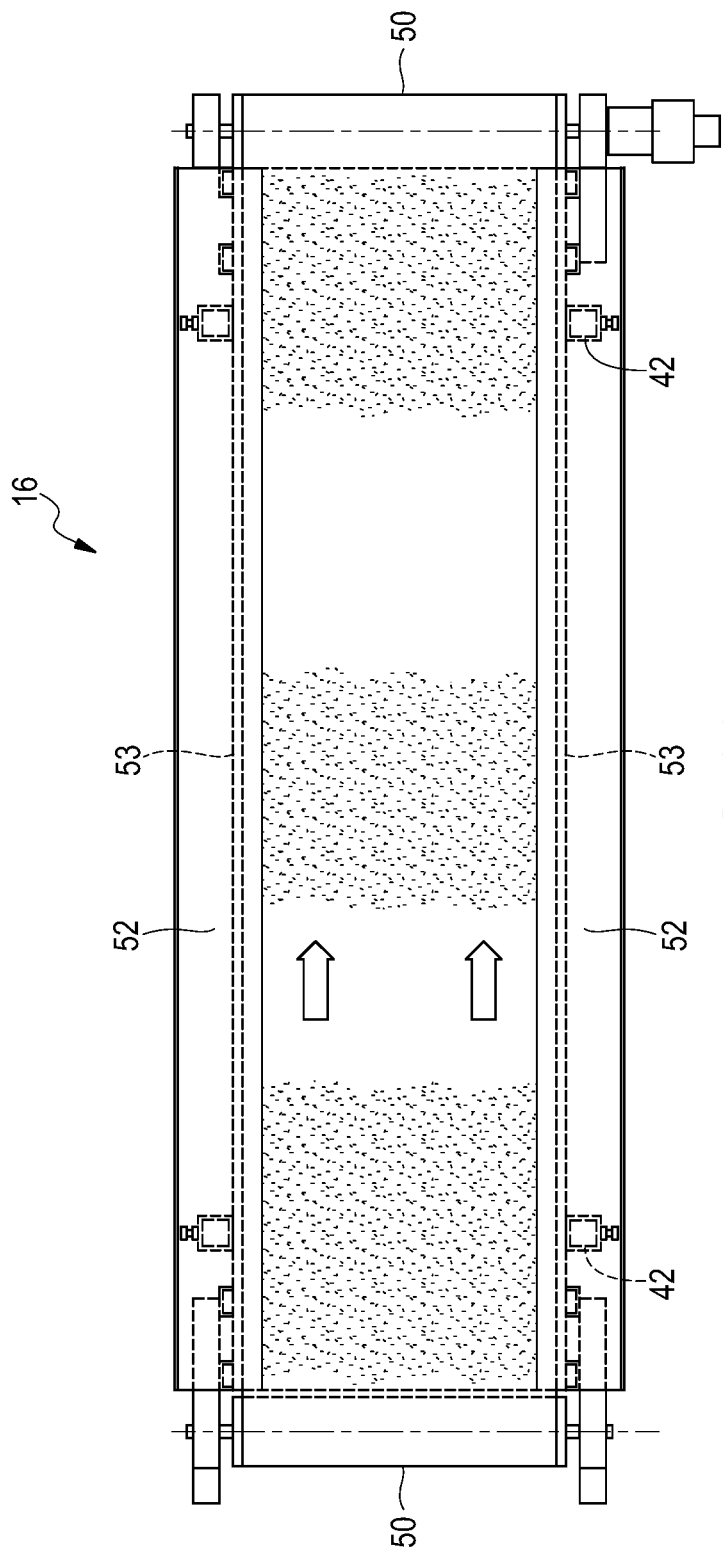
FIG. 11 is a top plan view of a baling apparatus in accordance with the present invention.

Referring to FIGS. 4, 7 and 8, conveyor 16 includes a three foot wide, continuous belt 48 that extends between a pair of rotatable spindles 50. Preferably, spindles 50 are protected by cages 49 for preventing material from impairing operation of conveyor 16. Cages 49 also prevent a user from inadvertently having a hand or clothing caught between belt 48 and spindles 50 which could result injury to the user. Conveyor 16 functions to receive plant material on belt 48 and transport the material to baler 18 for wrapping. To facilitate the delivery of plant material to belt 48 conveyor 16 includes a hopper section 51 defined by a pair of opposing guide plates 52 that act to funnel material to belt 48. Each guide plate 52 is supported at an angle by and to a conveyor guide wall 53 that extends longitudinally adjacent to belt 48 for maintaining material on the belt. Guide plates 52 increase the width of the area where plant material is introduced to conveyor 16 and guide the material to belt 48 for transportation to baler 18. As displayed in FIG. 11, guide plates 52, may extend along the length of conveyor 16 so that plant material is more easily introduced to belt 48 at any point along conveyor 16.

To drive and operate conveyor 16 and baler 18, baling apparatus 10 includes a number of drivers or motors that are operatively coupled to and powered by hydraulic power unit 14. These include at least one conveyor driver (not shown) operatively coupled to one or both of spindles 50 and configured to rotate spindles 50, when activated. Additional drivers include at least one baler drive motor 54. Baler drive motor 54 is operatively coupled to baler 18 by a drive shaft 56. Rotation of drive shaft 56 functions to drive operation of baler 18.

Figure 9:
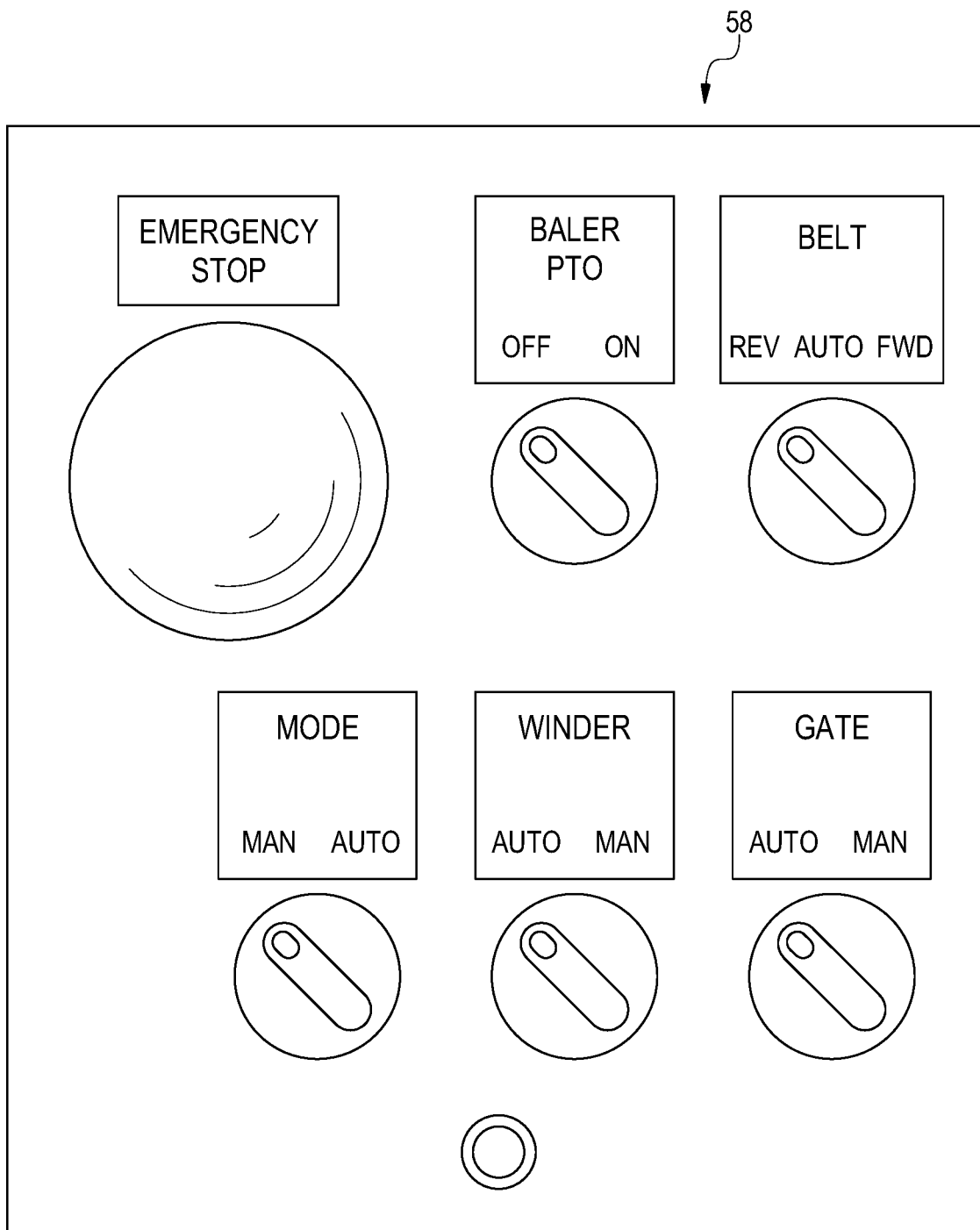
FIG. 9 is an elevations view of a control panel for the baling apparatus of FIG. 1.
Figure 10:
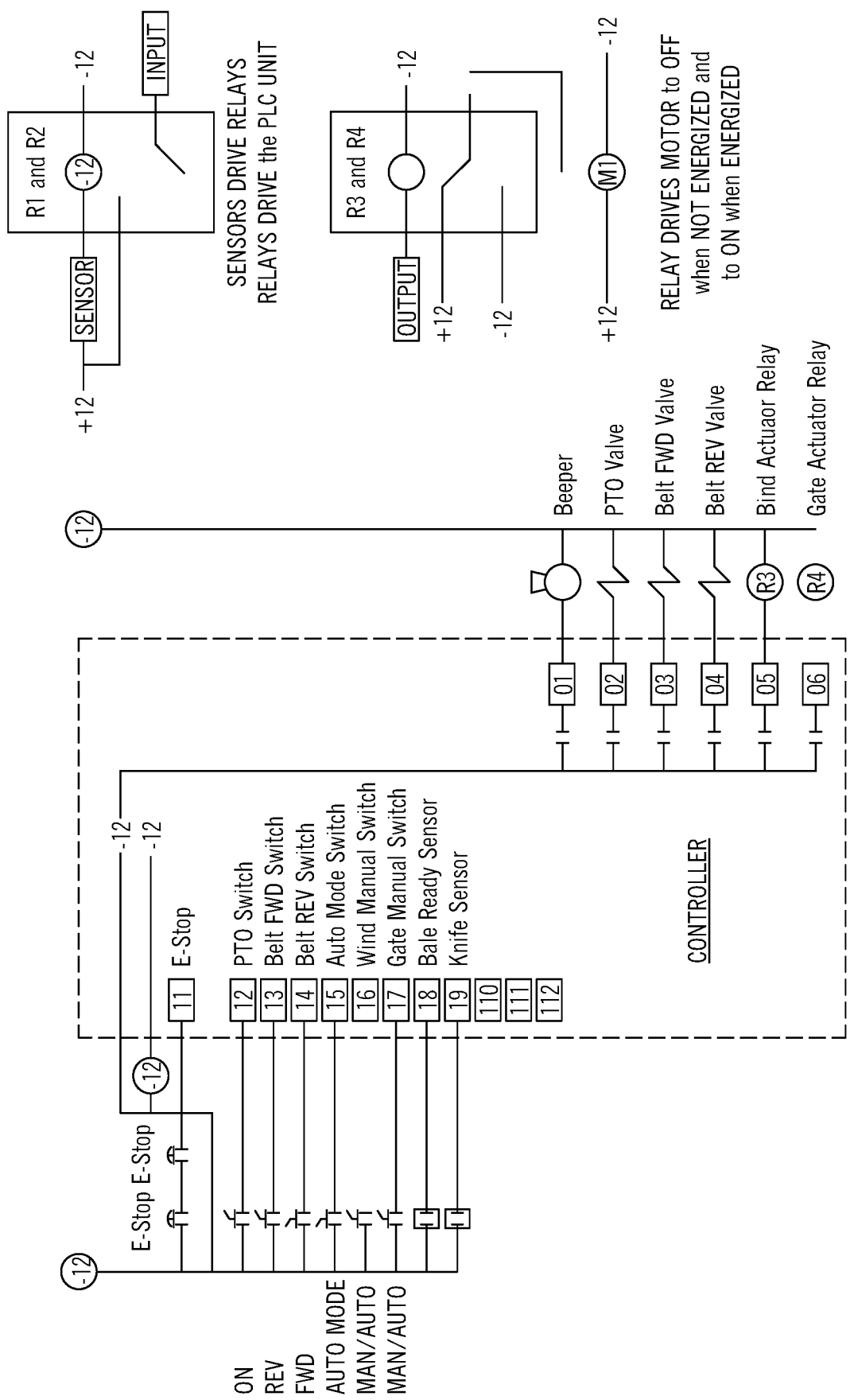
FIG. 10 is a schematic diagram of a controller for the baling apparatus of FIG. 1.

To control the conveyor driver and baler drive motor 54 and thereby operate baling apparatus 10, baling apparatus 10 includes an electronic control system and logic configured for starting operation of conveyor 16, automatically suspending operation of conveyor 16 when baler 18 contains a sufficient amount of material for initiating bundling of the material and automatically resuming operation of conveyor 16 following dispensing of a bundle of the material from baler 18. Referring to FIGS. 9 and 10, the control system includes an interface or control panel 58 and logic. Control panel 58 include a baler PTO switch for supplying power from power unit 14 to baler 18 via baler drive motor 54 and drive shaft 56 and a belt switch for alternating belt 48 movement from between a reverse direction, which moves material away from baler 18, a forward direction which moves material towards baler 18 and an auto setting which moves material towards baler 18 and automatically suspends and restarts forward movement of belt 48, as described below. Control panel 58 further includes an emergency stop button and mode, winder and gate switches for selecting between automatic and manual operation of baler 18. The logic of control system is described below in connection with the operation of baling apparatus 10.

In use, frame 12 is coupled to a motor vehicle via hitch 36 and transported to a location where plant material is gathered. Frame 12 is then positioned adjacent to the plant material, and jack 37 is extended thereby supporting the front section of the frame on the ground. Frame 12 may be disengaged from the motor vehicle or remain engaged during operation of baling apparatus 10.

With baling apparatus 10 in the desired location, a user first ensures that the PTO and mode switches are off to avoid starting the baling apparatus machinery when hydraulic power unit 14 is started. Hydraulic power unit 14 is then started and a desired motor speed is selected. Motor speed affects the speed at which conveyor 16 and baler 18 operate. With hydraulic power unit operational, the user turns on the PTO switch to send power to baler driver motor 54. Thereafter, to ensure there are no obstructions in conveyor 18, the belt switch is momentarily switched between reverse and forward, after which the switch automatically returns to the auto setting. With the belt switch in auto setting, the mode switch is switched from manual to auto thereby starting forward movement of belt 48. The logic of the auto setting for the mode switch is depicted in FIG. 10. At this time, plant material may be loaded into hopper section 51 onto belt 48 through guide plates 52. With the mode switch selected at auto, belt 48 moves forward thereby delivering the material to baler 18. Belt 48 will continues to deliver material to baler 18 until a bale sensor of baler 18 senses that sufficient material is collected within baler 18, at which time a signal is sent to the control system that causes belt 48 will stop.

Immediately after belt 48 stops, the winder device of baler 18 begins to run and wrap the plant material in a net. Once wrapped in the net, a cutter activates to cut the net. When the cutter activates, a rear gate of baler opens to allow bale 21 to exit the back of baler 18 where bale 21 is received by and rolls down ramp 20 to the ground. After bale 21 exits baler 18, the baler gate closes. Closure of the baler gate causes a signal to be sent from a sensor to the control system which, in turn, causes belt 48 to begin forward movement for transporting material to baler 18 for producing the next bale 21.

As will be apparent to one skilled in the art, various modifications can be made within the scope of the aforesaid description. Such modifications being within the ability of one skilled in the art form a part of the present invention and are embraced by the claims below.

It is claimed:

1. A method of baling a material comprising:
providing a baling apparatus including a hydraulic power unit having a hydrocarbon-fuel engine, a conveyor belt operatively coupled to the hydraulic power unit by a conveyor motor, a baler operatively coupled to the hydraulic power unit by a drive shaft powered by a baler motor and an electronic control system, wherein the hydraulic power unit, the hydrocarbon-fuel engine, the conveyor belt, the conveyor motor, the baler, the drive shaft, the baler motor and the electronic control system are supported on a frame,
placing a material on the conveyor,
conveying the material into the baler,
using the electronic control system to automatically suspend conveyance of the material into the baler,
using the baler to bundle the material,
dispensing a bale of the material from the baler, and
using the electronic control system to automatically resume conveyance of the material into the baler.

2. The method of claim 1 wherein placing the material on the conveyor does not depend on movement of the frame relative to a surface on which the frame is supported.

3. The method of claim 1 wherein the electronic control system automatically suspends conveyance of the material into the baler when the baler contains a desired amount of the material.

4. The method of claim 1 wherein the electronic control system automatically resumes conveyance of the material into the baler after dispensing of the bale of the material from the baler.

5. The method of claim 1 including switching operation of the baling apparatus from an automatic mode to a manual mode and thereafter suspending conveyance of the material into the baler by manually manipulating a switch.

6. The method of claim 1 including automatically suspending conveyance of the material into the baler, followed by, bundling the material, followed by, dispensing the bale of the material from the baler, followed by, automatically resuming conveyance of the material into the baler.

* * * * *